United States Patent
Spyrou et al.

(10) Patent No.: US 6,914,115 B2
(45) Date of Patent: Jul. 5, 2005

(54) LOW-TEMPERATURE-CURABLE, SOLID POLYURETHANE POWDER COATING COMPOSITIONS CONTAINING URETDIONE GROUPS

(75) Inventors: Emmanouil Spyrou, Marl (DE); Holger Loesch, Herne (DE); Andreas Wenning, Nottuln (DE)

(73) Assignee: Degussa AG, Duesseldorf (DE)

( * ) Notice: Subject to any disclaimer, the term of this patent is extended or adjusted under 35 U.S.C. 154(b) by 155 days.

(21) Appl. No.: 10/305,137

(22) Filed: Nov. 27, 2002

(65) Prior Publication Data

US 2003/0153713 A1 Aug. 14, 2003

(30) Foreign Application Priority Data

Feb. 11, 2002 (DE) ......................... 102 05 608

(51) Int. Cl.⁷ .................. C09D 175/04; C08G 18/80; C08G 18/16; C08G 18/79; C08L 75/04
(52) U.S. Cl. .................. 528/45; 427/385.5; 427/388.1; 427/388.2; 427/389; 427/389.7; 427/393; 427/393.5; 428/423.1; 428/425.1; 428/425.6; 428/425.8; 525/123; 525/124; 525/424; 525/440; 525/453; 525/454; 525/455; 525/457; 525/458; 525/460; 525/467; 525/528; 528/52; 528/53; 528/54; 528/60; 528/65; 528/66; 528/73; 528/76; 528/80; 528/85
(58) Field of Search .................. 427/385.5, 388.1, 427/388.2, 389, 389.7, 393, 393.5; 428/423.1, 425.1, 425.6, 425.8; 525/123, 124, 424, 440, 453, 454, 455, 457, 458, 460, 467, 528; 528/45, 52, 53, 54, 60, 65, 66, 73, 76, 80, 85

(56) References Cited

U.S. PATENT DOCUMENTS

| | | | |
|---|---|---|---|
| 4,732,957 A | 3/1988 | Schuster et al. | 528/58 |
| 5,464,921 A | 11/1995 | Laas et al. | 528/67 |
| 5,777,061 A * | 7/1998 | Yonek et al. | 528/45 |

FOREIGN PATENT DOCUMENTS

| | | |
|---|---|---|
| DE | 198 56 878 | 6/2000 |
| EP | 0 065 863 | 12/1982 |
| GB | 2 119 356 | 11/1983 |
| WO | WO 99/64233 | 12/1999 |

OTHER PUBLICATIONS

U.S. Appl. No. 10/836,540, filed May 3, 2004, Spyrou et al.
U.S. Appl. No. 10/836,407, filed May 3, 2004, Spyrou et al.
K. Jinsoo, et al. Chemie Ingenieur Technik, vol. 73, No. 5, pp. 461–468, XP–001154914, "Sol–Gel Synthesis and Spray Granulation of Porous Titania Powder", 2001.
R. K. Karn, et al., International Journal of Hydrogen Energy, vol. 24, No. 1, pp. 27–35, XP–004158829, "On the Synthesis of Nanostructured TiO₂ Anatase Phase and the Development of the Photoelectrochemical Solar Cell", Jan. 1999.
B. O'Regan, et al., Nature, vol. 353, No. 6346, pp. 737–740, XP–000371693, "A Low–Cost, High Efficiency Solar Cell Based on Dye–Sensitized Colloidal TiO₂ Films", Oct. 24, 1991.

* cited by examiner

Primary Examiner—Rabon Sergent
(74) Attorney, Agent, or Firm—Oblon, Spivak, McClelland, Maier & Neustadt, P.C.

(57) ABSTRACT

Polyurethane powder coating compositions containing uretdione groups and curing at low temperatures are provided, along with processes for preparing such compositions, and their use as powder coatings, wherein the compositions generally contain: A) a uretdione-containing powder coating hardener derived from aliphatic, (cyclo)aliphatic, cycloaliphatic or aromatic polyisocyanates and hydroxyl-containing compounds, and having a melting point from 40 to 130° C., a free NCO content of less than 5% by weight, and a uretdione content of 6–18% by weight; B) a hydroxyl-containing polymer having a melting point from 40 to 130° C., and an OH number between 20 and 200 mg KOH/gram, and C) a catalyst of the formula $[NR^1R^2R^3R^4]^+[R^5]^-$, in which $R^1$–$R^4$ simultaneously, or independently of one another, are alkyl, aryl, aralkyl, heteroaryl or alkoxyalkyl radicals, and each $R^1$–$R^4$ is aromatic, linear or branched, unbridged or bridged with other radicals, $R^1$–$R^4$.

32 Claims, No Drawings

LOW-TEMPERATURE-CURABLE, SOLID POLYURETHANE POWDER COATING COMPOSITIONS CONTAINING URETDIONE GROUPS

BACKGROUND OF THE INVENTION

1. Field of the Invention

The invention relates to solid polyurethane powder coating compositions which contain uretdione groups and cure at low baking temperatures, to processes for preparing such compositions, and to their use for producing plastics, especially powder coatings, which crosslink to high-gloss or matt, light- and weather-stable coating films.

2. Description of the Background

Externally or internally blocked polyisocyanates which are solid at room temperature constitute valuable crosslinkers for thermally crosslinkable polyurethane (PU) powder coating compositions. For example, DE-A 27 35 497 describes PU powder coatings featuring outstanding weathering stability and thermal stability. The crosslinkers whose preparation is described in DE-A 27 12 931 are composed of isophorone diisocyanate which contains isocyanurate groups and is blocked with ε-caprolactam. Also known are polyisocyanates which contain urethane, biuret or urea groups and whose isocyanate groups are likewise blocked.

The disadvantage of these externally blocked systems lies in the elimination of the blocking agent during the thermal crosslinking reaction. Since the blocking agent may thus be emitted into the environment, it is necessary on environmental and occupational hygiene grounds to take special measures to clean the outgoing air and/or to recover the blocking agent. Moreover, the reactivity of the crosslinkers is low. Curing temperatures above 170° C. are required.

DE-A 3030539 and DE-A 3030572 describe processes for preparing polyaddition compounds which contain uretdione groups and whose terminal isocyanate groups are irreversibly blocked with monoalcohols or monoamines. A particular disadvantage are the chain-terminating constituents of the crosslinkers, which lead to low network densities in the PU powder coatings and thus to moderate solvent resistances.

Hydroxyl-terminated polyaddition compounds containing uretdione groups are subject matter of EP 0 669 353. On the basis of their functionality of two they exhibit improved resistance to solvents. A common feature of the powder coating compositions based on these polyisocyanates containing uretdione groups is that they do not emit any volatile compounds in the course of the curing reaction. However, at at least 180° C., the baking temperatures are high.

The use of amidines as catalysts in PU powder coating compositions is described in EP 803 524. Although these catalysts lead to a reduction in the curing temperature, they exhibit a marked yellowing, which is generally unwanted in the coatings field. The cause of this yellowing is probably the reactive nitrogen atoms in the amidines. These can react with atmospheric oxygen to give N-oxides, which are responsible for the discoloration.

EP 803 524 also mentions other catalysts which have been used to date for this purpose, but without showing any particular effect on the curing temperature. They include the organometallic catalysts known from polyurethane chemistry, such as dibutyltin dilaurate (DBTL), for example, or else tertiary amines, such as 1,4-diazabicyclo[2.2.2] octane (DABCO), for example.

WO 00/34355 claims catalysts based on metal acetylacetonates, e.g., zinc acetylacetonate. Such catalysts are in fact able to lower the curing temperature of polyurethane powder coating compositions containing uretdione groups, but as reaction products give primarily allophanates (M. Gedan-Smolka, F. Lehmann, D. Lehmann, "New catalysts for the low temperature curing of uretdione powder coatings" *International Waterborne, High solids and Powder Coatings Symposium*, New Orleans, Feb. 21–23, 2001). Allophanates are the reaction products of one mole of alcohol and two moles of isocyanate, whereas in the conventional urethane chemistry one mole of alcohol reacts with one mole of isocyanate. As the result of the unwanted formation of allophanates, therefore, isocyanate groups valuable both technically and economically are destroyed.

SUMMARY OF THE INVENTION

It is an object of the present invention, therefore, to provide highly reactive polyurethane powder coating compositions containing uretdione groups which can be cured even at very low temperatures and which are particularly suitable for producing plastics and also for producing high-gloss or matt, light- and weather-stable powder coatings.

It has surprisingly been found that quaternary ammonium salts with hydroxide or fluoride counterions accelerate the cleavage of uretdione groups so greatly that when using known, uretdione-containing powder coating hardeners it is possible to considerably reduce the curing temperature of the powder coating compositions.

Thus, the present invention provides a polyurethane powder coating composition, comprising:

A) at least one uretdione-containing powder coating hardener based on aliphatic, (cyclo)aliphatic or cycloaliphatic polyisocyanates and hydroxyl-containing compounds, having a melting point of from 40 to 130° C., a free NCO content of less than 5% by weight, and a uretdione content of 6–18% by weight, B) at least one hydroxyl-containing polymer having a melting point of from 40 to 130° C., and an OH number of between 20 and 200 mg KOH/gram, and C) at least one catalyst of the formula $[NR^1R^2R^3R^4]^+[R^5]^-$, in which $R^1$–$R^4$ simultaneously or independently of one another are alkyl, aryl, aralkyl, heteroaryl or alkoxyalkyl radicals, each linear or branched, unbridged or bridged with other radicals $R^1$–$R^4$, to form cyclic, bicyclic or tricyclic systems, possible bridging atoms including not only carbon but also heteroatoms, having 1–18 carbon atoms and each radical $R^1$–$R^4$ may further contain one or more alcohol, amino, ester, keto, thio, urethane, urea or allophanate groups, double bonds, triple bonds or halogen atoms, and $R^5$ is either OH or F, D) optionally, a reactive compound which is able to react at elevated temperatures with any acid groups that may be present in component B), and E) optionally, auxiliaries and additives known from powder coating chemistry, such that the two components A) and B) are present in a ratio such that for each hydroxyl group of component B)

there is from 0.3 to 1 uretdione group of component A), the fraction of the catalyst under C) is 0.001–3% by weight of the total amount of components A) and B), and D) is present where appropriate in an amount such that for each acid group of the resin under B) there are 0.1–10 acid-scavenging units of the reactive compound.

The invention further provides a process for preparing the powder coating composition by combining the components.

The invention additionally provides for the use of the powder coating compositions of the invention for producing powder coatings on a substrate, e.g., metal, plastics, glass, wood or leather substrates or other heat-resistant substrates. Thus, the present invention provides a method for coating a substrate comprising applying the powder coating compositions of the invention to the substrate.

The invention additionally provides metal coating compositions, especially for automobile bodies, motorbikes and bicycles, construction components, and household appliances, wood coating compositions, glass coating compositions, leather coating compositions, and plastics coating compositions essentially comprising a polyurethane powder coating composition, comprising:

A) at least one uretdione-containing powder coating hardener based on aliphatic, (cyclo)aliphatic or cycloaliphatic polyisocyanates and hydroxyl-containing compounds, having a melting point of from 40 to 130° C., a free NCO content of less than 5% by weight, and a uretdione content of 6–18% by weight, B) at least one hydroxyl-containing polymer having a melting point of from 40 to 130° C., and an OH number of between 20 and 200 mg KOH/gram, and C) at least one catalyst of the formula $[NR^1R^2R^3R^4]^+[R^5]^-$, in which $R^1$–$R^4$ simultaneously or independently of one another are alkyl, aryl, aralkyl, heteroaryl or alkoxyalkyl radicals, each linear or branched, unbridged or bridged with other radicals $R^1$–$R^4$, to form cyclic, bicyclic or tricyclic systems, possible bridging atoms including not only carbon but also heteroatoms, having 1–18 carbon atoms and each radical $R^1$–$R^4$ may further contain one or more alcohol, amino, ester, keto, thio, urethane, urea or allophanate groups, double bonds, triple bonds or halogen atoms, and $R^5$ is either OH or F, such that the two components A) and B) are present in a ratio such that for each hydroxyl group of component B) there is from 0.3 to 1 uretdione group of component A), and the fraction of the catalyst under C) is 0.001–3% by weight of the total amount of components A) and B).

The present invention also provides a method of providing a catalyst to a polyurethane powder coating composition, comprising incorporating into a polyurethane powder coating composition at least one catalyst of the formula $[NR^1R^2R^3R^4]^+[R^5]^-$, in which $R^1$–$R^4$ simultaneously or independently of one another are alkyl, aryl, aralkyl, heteroaryl or alkoxyalkyl radicals, each linear or branched, unbridged or bridged with other radicals $R^1$–$R^4$, to form cyclic, bicyclic or tricyclic systems, possible bridging atoms including not only carbon but also heteroatoms, having 1–18 carbon atoms and each radical $R^1$–$R^4$ may further contain one or more alcohol, amino, ester, keto, thio, urethane, urea or allophanate groups, double bonds, triple bonds or halogen atoms, and $R^5$ is either OH or F.

The present invention also provides a method of catalyzing the curing polyurethane powder coating composition, comprising reacting a polyurethane powder coating composition which contains A) at least one uretdione-containing powder coating hardener based on aliphatic, (cyclo)aliphatic or cycloaliphatic polyisocyanates and hydroxyl-containing compounds, having a melting point of from 40 to 130° C., a free NCO content of less than 5% by weight, and a uretdione content of 6–18% by weight, and B) at least one hydroxyl-containing polymer having a melting point of from 40 to 130° C., and an OH number of between 20 and 200 mg KOH/gram, in the presence of a catalytically effective amount of at least one catalyst of the formula $[NR^1R^2R^3R^4]^+[R^5]^-$, in which $R^1$–$R^4$ simultaneously or independently of one another are alkyl, aryl, aralkyl, heteroaryl or alkoxyalkyl radicals, each linear or branched, unbridged or bridged with other radicals $R^1$–$R^4$, to form cyclic, bicyclic or tricyclic systems, possible bridging atoms including not only carbon but also heteroatoms, having 1–18 carbon atoms and each radical $R^1$–$R^4$ may further contain one or more alcohol, amino, ester, keto, thio, urethane, urea or allophanate groups, double bonds, triple bonds or halogen atoms, and $R^5$ is either OH or F.

A more complete appreciation of the invention and many of the attendant advantages thereof will be readily obtained as the same becomes better understood by reference to the following detailed description below.

DETAILED DESCRIPTION OF THE INVENTION

Polyisocyanates containing uretdione groups are well known and are described, for example, in U.S. Pat. No. 4,476,054, U.S. Pat. No. 4,912,210, U.S. Pat. No. 4,929,724 and EP 417 603, all incorporated herein by reference. A comprehensive overview of industrially relevant processes for dimerizing isocyanates to give uretdiones is given by J. Prakt. Chem. 336 (1994) 185–200, incorporated herein by reference. In general, isocyanates are reacted to uretdiones in the presence of soluble dimerization catalysts such as, for example, dialkylaminopyridines, trialkylphosphines, phosphorous triamides or imidazoles. The reaction—conducted optionally in solvents but preferably in their absence—is terminated by adding catalyst poisons when a desired conversion has been reached. Excess monomeric isocyanate is subsequently separated off by short-path evaporation. If the catalyst is volatile enough, the reaction mixture can be freed from the catalyst in the course of the separation of monomer. In this case there is no need to add catalyst poisons. In principle, a broad palette of isocyanates is suitable for the preparation of polyisocyanates containing uretdione groups. In accordance with the invention, isophorone diisocyanate (IPDI), hexamethylene diisocyanate (HDI), 2-methylpentane diisocyanate (MPDI), 2,2,4-trimethylhexamethylene diisocyanate/2,4,4-trimethylhexamethylene diisocyanate (TMDI), norbomane diisocyanate (NBDI), methylenediphenyl diisocyanate (MDI), and tetramethylxylylene diisocyanate (TMXDI) are used with preference. Very particular preference is given to IPDI and HDI.

The reaction of these polyisocyanates carrying uretdione groups to give powder coating hardeners A) containing uretdione groups includes the reaction of the free NCO groups with hydroxyl-containing monomers or polymers, such as polyesters, polythioethers, polyethers, polycaprolactams, polyepoxides, polyesteramides, polyurethanes or low molecular mass di-, tri- and/or tetraalcohols as chain extenders and, if desired, monoamines and/or monoalcohols as chain terminators and has already been described on many occasions (EP 669 353, EP 669 354, DE 30 30 572, EP 639 598 or EP 803 524, all incorporated herein by reference). Preferred powder coating hardeners A) containing uretdione groups have a free NCO content of less than 5% by weight and a uretdione group content of from 6 to 18% by weight (calculated as $C_2N_2O_2$, molecular weight 84). This range for the uretdione group content includes all specific values and subranges therebetween, such as 8, 10, 12, 14, and 16% by weight. Polyesters and monomeric dialcohols are preferred. Besides the uretdione groups, the powder coating hardeners may also contain isocyanurate, biuret, allophanate, urethane and/or urea structures.

In the case of the hydroxyl-containing polymers B), preference is given to the use of polyesters, polyethers, polyacrylates, polyurethanes and/or polycarbonates having an OH number of 20–200 (in mg KOH/gram). This range for the OH number includes all specific values and subranges therebetween, such as 50, 100, 150, and 175 mg KOH/gram. Particular preference is given to using polyesters having an OH number of 30–150, an average molecular weight of 500–6000 g/mol, and a melting point of between 40 and 130° C. This range for the melting point includes all specific values and subranges therebetween, such as 50, 60, 70, 80, 90, 100, 110, and 120° C. Binders of this kind have been described, for example, in EP 669 354 and EP 254 152, both incorporated herein by reference. It is of course also possible to use mixtures of such polymers. The range for the molecular weight described above includes all specific values and subranges therebetween, such as 600, 800, 1,000, 1,500, 2000, 2,500, 3,000, 3,500, 4,000, 4,500, 5,000, and 5,500.

As discussed above, the amount of the hydroxyl-containing polymers B) is chosen such that for each hydroxyl group of component B) there is from 0.3 to 1 uretdione group of component A). This range includes all specific values and subranges therebetween, such as 0.4, 0.5, 0.6, 0.7, 0.8, and 0.9.

The invention also provides for the use of at least one catalyst of the formula $[NR^1R^2R^3R^4]^+[R^5]^-$, in which $R^1$–$R^4$ simultaneously or independently of one another are alkyl, aryl, aralkyl, heteroaryl or alkoxyalkyl radicals, each linear or branched, unbridged or bridged with other radicals $R^1$–$R^4$, to form cyclic, bicyclic or tricyclic systems, possible bridging atoms including not only carbon but also heteroatoms, having 1–18 carbon atoms and each radical $R^1$–$R^4$ may further contain one or more alcohol, amino, ester, keto, thio, urethane, urea or allophanate groups, double bonds, triple bonds or halogen atoms, and $R^5$ is either OH or F, in polyurethane powder coating compositions, and also the catalysts themselves.

The catalysts C) essential to the invention are quaternary ammonium salts of the formula $[NR^1R^2R^3R^4]^+[R^5]^-$, in which $R^1$–$R^4$ simultaneously or independently of one another are alkyl, aryl, aralkyl, heteroaryl or alkoxyalkyl radicals, each linear or branched, unbridged or bridged with other radicals $R^1$–$R^4$, to form cyclic, bicyclic or tricyclic systems, possible bridging atoms including not only carbon but also heteroatoms, having 1–18 carbon atoms and each radical $R^1$–$R^4$ may further contain one or more alcohol, amino, ester, keto, thio, urethane, urea or allophanate groups, double bonds, triple bonds or halogen atoms, and $R^5$ is either OH or F, such as, for example, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethyl-ammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride, and benzyltrimethylammonium fluoride. Particular preference is given to tetrabutylammonium hydroxide. Mixtures of such catalysts are also suitable, of course. They are present in the powder coating composition in an amount of 0.001–3% by weight, preferably 0.01–3% by weight, based on components A) and B). The catalysts may contain water of crystallization, which is not taken into account when calculating the amount of catalyst employed; that is, the amount of water is removed during the calculation. A further key advantage of such quaternary ammonium salts is that such compounds cannot be oxidized on the nitrogen atom. There is therefore no possibility of unwanted yellowing of the powder coating compositions as a result of N-oxides.

As used herein, the term "comprising" means that the composition may include other components, i.e., in addition to A), B), and C). One skilled in the art will readily appreciate which additional components are suitable for the inventive composition. The term "consisting essentially of" means that the composition does not contain additional components which materially affect the basic properties of the composition.

One variant according to the invention comprises the polymeric attachment of such catalysts C) to powder coating hardeners A) or hydroxyl-containing polymers B). Thus it is possible, for example, to react free alcohol, thio or amino groups of the ammonium salts with acid, isocyanate or glycidyl groups of the powder coating hardeners A) or hydroxyl-containing polymers B), in order to integrate the catalysts C) into the polymeric system.

In this context it must be borne in mind that the activity of these catalysts decreases sharply in the presence of acids. The conventional co-reactants of the uretdione-containing powder coating hardeners include hydroxyl-containing polyesters. Because of the way in which polyesters are prepared, they occasionally still carry acid groups to a minor extent. In the presence of polyesters of this kind which carry acid groups, therefore, it is appropriate either to use the aforementioned catalysts in excess over the acid groups or else to add reactive compounds which are able to scavenge acid groups.

Reactive, acid-scavenging compounds D) are common knowledge in coatings chemistry. For example, epoxy compounds, carbodiimides or else 2-oxazolines react with acid groups at elevated temperatures. Suitable examples include triglycidyl ether isocyanurate (TGIC), EPIKOTE 828 (diglycidyl ether based on bisphenol A, Shell), and also phenylenebisoxazoline, 2-methyl-2-oxazoline, 2-hydroxyethyl-2-oxazoline, 2-hydroxypropyl-2-oxazoline, and 5-hydroxypentyl-2-oxazoline. Mixtures of such substances are of course also suitable. This reactive compound D) is only employed when acid groups are present in the powder coating composition. Where such acid groups are present in the powder coating composition, the amount of reactive component D) added is such that for each acid group there are 0.1–10 acid-scavenging units of component D). This range includes all specific values and subranges therebetween, such as 0.2, 0.5, 1, 2, 3, 5, and 8 acid-scavenging units of component D) for each acid group. It is also possible to use catalysts which accelerate this reaction, such as benzyltrimethylammonium chloride, for example.

For the preparation of powder coating materials it is possible to add the additives E) customary in powder coating technology, such as leveling agents, e.g., polysilicones or acrylates, light stabilizers, e.g., sterically hindered amines, or other auxiliaries, as described, for example, in EP 669 353, incorporated herein by reference, in a total amount of from 0.05 to 5% by weight. This range includes all specific values and subranges therebetween, such as 0.1, 0.2, 0.5, 1, 2, 3, and 4% by weight. Fillers and pigments such as titanium dioxide, for example, can be added in an amount of up to 50% by weight of the total composition.

Additional catalysts, such as are already known in polyurethane chemistry, may optionally be present. These are primarily organometallic catalysts, such as dibutyltin dilaurate, or else tertiary amines, such as 1,4-diazabicyclo[2.2.2]octane, in amounts of 0.001–1% by weight. This range includes all specific values and subranges therebetween, such as 0.002, 0.005, 0.01, 0.02, 0.05, 0.1, 0.2, 0.5, and 0.8% by weight.

Conventional uretdione-containing powder coating compositions can be cured only above 180° C. under normal conditions (DBTL catalysis). With the aid of the low-temperature-curing powder coating compositions of the invention, with cure temperatures of a maximum of 160° C. (lower cure temperatures are entirely possible), it is possible not only to save energy and (cure) time but also to coat a large number of temperature-sensitive substrates which at 180° C. would exhibit unwanted yellowing, decomposition and/or embrittlement phenomena. Besides metal, glass, wood, leather, plastics, and MDF boards, certain aluminum substrates are prime candidates. In the case of the latter substrates, an excessive temperature load sometimes leads to an unwanted change in the crystal structure.

The homogenization of all of the ingredients for preparing a powder coating composition can take place in suitable equipment, such as heatable kneading apparatus, for example, but preferably by extrusion, in the course of which upper temperature limits of 120 to 130° C. ought not to be exceeded. After cooling to room temperature and appropriate comminution, the extruded mass is ground to give the ready-to-spray powder. Application of the ready-to-spray powder to appropriate substrates can be carried out in accordance with the known techniques, such as by electrostatic powder spraying, fluidized-bed sintering, or electrostatic fluid-bed sintering, for example. Following powder application, the coated workpieces are cured by heating at a temperature of from 120 to 220° C. for from 4 to 60 minutes, preferably at from 120 to 180° C. for from 6 to 30 minutes.

EXAMPLES

Having generally described this invention, a further understanding can be obtained by reference to certain specific examples which are provided herein for purposes of illustration only and are not intended to be limiting unless otherwise specified.

| Components | Product description, manufacturer |
|---|---|
| VESTAGON BF 1320 | Powder coating hardener, Degussa AG, Coatings & Colorants, uretdione content: 13.8%, m.p.: 99–112° C., $T_g$: 87° C. |
| Crylcoat 240 | OH-polyester, OH number: 24.5; AN: 3.3; UCB |
| Araldit PT 810 | Triglycidyl ether isocyanurate (TGIC), Vantico |
| KRONOS 2160 | Titanium dioxide, Kronos |
| RESIFLOW PV 88 | Leveling agent, Worlee |
| BTAC | Benzyltrimethylammonium chloride, Aldrich |
| TMAH | Tetramethylammonium hydroxide WC: 50, Aldrich |
| TBAH | Tetrabutylammonium hydroxide, WC: 68, Aldrich |
| BTMAF | Benzyltrimethylammonium fluoride, WC: 12, Aldrich |
| DBTL | Dibutyltin dilaurate, Crompton Vinyl Additives GmbH |

OH number: consumption in mg of KOH/g of polymer;
AN: acid number, consumption in mg of KOH/g of polymer;
m.p.: melting point;
$T_g$: glass transition point;
WC: water content in % by weight (the water content of the catalyst was not taken into account during use, i.e., the water-free amount of the catalysts used differs, in some cases considerably, in the individual experiments.)

General preparation instructions for the powder coating materials:

The comminuted ingredients—powder coating hardener, hydroxy-functional polymers, catalysts, acid scavengers, leveling agents—are intimately mixed in an edge runner mill and then homogenized in an extruder at up to 130° C. maximum. After cooling, the extrudate is fractionated and ground with a pinned-disc mill to a particle size <100 μm.

The powder thus prepared is applied to degreased iron panels using an electrostatic powder spraying system at 60 kV, and the coated panels are baked in a forced air dryer.

Powder coating compositions (amounts in % by weight, except for OH/UD):

| Examples | VESTAGON BF 1320 | Crylcoat 240 | TMAH | TBAH | BTMAF | DBTL | OH/UD |
|---|---|---|---|---|---|---|---|
| 1 | 10.43 | 46.11 | 0.46 | | | | 1.00:0.75 |
| 2 | 13.07 | 43.35 | 0.58 | | | | 1.00:1.00 |
| 3 | 10.43 | 46.11 | | 0.46 | | | 1.00:1.00 |
| 4 | 13.07 | 43.35 | | 0.58 | | | 1.00:0.75 |
| 5 | 10.43 | 46.11 | | | 0.46 | | 1.00:1.00 |
| 6 | 13.07 | 43.35 | | | 0.58 | | 1.00:0.75 |
| C1* | 10.43 | 46.11 | | | | 0.46 | 1.00:1.00 |
| C2* | 13.07 | 43.35 | | | | 0.58 | 1.00:0.75 |

*Noninventive comparative examples
OH/UD: ratio of OH groups to uretdione groups (mol:mol)

In addition, the following were used in each of the formulations: 40.0% by weight KRONOS 2160, 1.0% by weight RESIFLOW PV 88, 1.5% by weight Araldit PT 810, and 0.5% by weight BTAC.

Results of curing at 160° C. after 30 minutes:

| Examples | Erichsen cupping [mm] | Ball impact direct [inch · lb] | Yi | Remarks |
|---|---|---|---|---|
| 1 | >10.0 | 90 | 1.5 | cured |
| 2 | 5.0 | 80 | 3.0 | partly cured |
| 3 | >10.0 | 140 | 1.0 | cured |
| 4 | >10.0 | >160 | 1.1 | cured |
| 5 | 9.5 | 90 | 1.0 | cured |
| 6 | 4.0 | 70 | 1.4 | partly cured |
| C1* | 0.5 | 30 | 1.1 | not cured |
| C2* | 0.5 | 20 | 1.2 | not cured |

Erichsen cupping to DIN 53 156, incorporated herein by reference
Ball impact to ASTM D 2794-93, incorporated herein by reference
Yi: yellowness index DIN 5033, incorporated herein by reference Obviously, numerous modifications and variations of the present invention are possible in light of the above teachings. It is therefore to be understood that within the scope of the appended claims, the invention may be practiced otherwise than as specifically described herein.

This application is based on German Patent Application Serial No. 10205608.0, filed on Feb. 11, 2002, and incorporated herein by reference.

What is claimed is:

1. A polyurethane powder coating composition, comprising:

A) at least one uretdione-containing powder coating hardener derived from one or more aliphatic, (cyclo) aliphatic, cycloaliphatic, or aromatic polyisocyanates and one or more hydroxyl-containing compounds, and/ or one or more monoamines, and having a melting point from 40 to 130° C., a free NCO content of less than 5% by weight, and a uretdione content of 6–18% by weight, B) at least one hydroxyl-containing polymer having a melting point from 40 to 130° C., and an OH number between 20 and 200 mg KOH/gram, and C) at least one catalyst of the formula $[NR^1R^2R^3R^4]^+$ $[R^5]^-$, in which $R^1-R^4$ simultaneously, or independently of one another, are alkyl, aryl, aralkyl, heteroaryl or alkoxyalkyl radicals, and wherein each $R^1-R^4$ is aromatic, linear or branched, or unbridged or bridged with other radicals, $R^1-R^4$, to form cyclic, bicyclic or tricyclic systems, and wherein the bridging atoms include carbon and/or heteroatoms, and wherein $R^1-R^4$ each independently has 1–18 carbon atoms, and wherein each radical $R^1-R^4$ optionally contains one or more alcohol, amino, ester, keto, thio, urethane, urea or allophanate groups, double bonds, triple bonds or halogen atoms; and $R^5$ is either OH or F, and wherein components A) and B) are present in a ratio, such that for each hydroxyl group of component B), there is from 0.3 to 1 uretdione group of component A), and the fraction of component C) is 0.001–3% by weight of the total amount of components A) and B).

2. The polyurethane powder coating composition as claimed in claim 1, further comprising:

D) a reactive compound which is able to react with any acid group that may be present in component B), in an amount, such that for each acid group of component B), there are 0.1–10 acid-scavenging units of component D).

3. The polyurethane powder coating composition as claimed in claim 1, further comprising:

E) auxiliaries and additives.

4. The polyurethane powder coating composition as claimed in claim 1, which consists essentially of components A), B), and C).

5. The polyurethane powder coating composition as claimed in claim 2, which consists essentially of components A), B), C), and D).

6. The polyurethane powder coating composition as claimed in claim 3, which consists essentially of components A), B), C), E) and D) a reactive compound which is able to react with any acid group that may be present in component B), in an amount, such that for each acid group of component B), there are 0.1–10 acid-scavenging units of component D).

7. The polyurethane powder coating composition as claimed in claim 1, wherein the one or more polyisocyanates of component A) are derived from isocyanates selected from isophorone diisocyanate (IPDI), hexamethylene diisocyanate (HDI), 2-methylpentane diisocyanate (MPDI), 2,2,4- trimethylhexamethylene diisocyanate/2,4,4-trimethylhexamethylene diisocyanate (TMDI), norbornane diisocyanate (NBDI), methylenediphenyl diisocyanate (MDI), and tetramethylxylylene diisocyanate (TMXDI), or mixtures thereof.

8. The polyurethane powder coating composition as claimed in claim 7, wherein the isocyanates are selected from IPDI, HDI or mixtures thereof.

9. The polyurethane powder coating composition as claimed in claim 1, wherein the one or more hydroxyl-containing compounds of component A) are selected from hydroxyl-containing polyesters, polythioethers, polyethers, polycaprolactams, polyepoxides, polyesteramides, polyurethanes, low molecular mass di-, tri- and/or tetraalcohols, monoalcohols, or mixtures thereof.

10. The polyurethane powder coating composition as claimed in claim 9, wherein the one or more hydroxyl-containing compounds of component A) are selected from polyesters, low molecular mass dialcohols or mixtures thereof.

11. The polyurethane powder coating composition as claimed in claim 1, wherein the at least one hydroxyl-containing polymer of component B) comprises polyesters, polyethers, polyacrylates, polyurethanes, polycarbonates, or mixtures thereof.

12. The polyurethane powder coating composition as claimed in claim 11, wherein the at least one hydroxyl-containing polymer of component B) comprises polyesters having an OH number from 30 to 150 mg KOH/g, an average molecular weight from 500 to 6000 g/mol, and a melting point between 40 and 130° C.

13. The polyurethane powder coating composition as claimed in claim 12, wherein component C) comprises tetraalkylammonium hydroxide and/or tetraalkylammonium fluoride.

14. The polyurethane powder coating composition as claimed in claim 1, wherein component C) comprises one or more members selected from the group consisting of methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetra-decylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride, and benzyltrimethylammonium fluoride.

15. The polyurethane powder coating composition as claimed in claim 2, wherein component D) comprises epoxy compounds, carbodiimides and/or 2-oxazolines.

16. The polyurethane powder coating composition as claimed in claim 15, wherein component D) comprises triglycidyl ether isocyanurate, a diglycidyl ether of bisphenol A, phenylenebisoxazoline, 2-methyl-2-oxazoline, 2-hydroxyethyl-2-oxazoline, 2-hydroxypropyl-2-oxazoline, 5-hydroxypentyl-2-oxazoline, or mixtures thereof.

17. The polyurethane powder coating composition as claimed in claim 3, wherein component E) comprises leveling agents, light stabilizers, filler, additional catalysts and/or pigments.

18. A coated metal comprising the polyurethane powder coating composition as claimed in claim 1, in the cured state, and a metal.

19. A coated wood comprising the polyurethane powder coating composition as claimed in claim 1, in the cured state, and wood.

20. A coated leather comprising the polyurethane powder coating composition as claimed in claim 1, in the cured state, and a leather.

21. A coated plastic comprising the polyurethane powder coating composition as claimed in claim 1, in the cured state, and a plastic.

22. A process for preparing a polyurethane powder coating composition as claimed in claim 1, comprising combining components A), B), and C).

23. The process according to claim 22, wherein components A), B), and C) are combined at a temperature of at most 130° C.

24. The process according to claim 22, wherein components A), B), and C) are combined at a temperature of at most 120° C.

25. A method of coating a substrate, comprising applying the polyurethane powder coating composition as claimed in claim 1, to the substrate.

26. The method as claimed in claim 25, wherein the substrate is heat-resistant.

27. The method as claimed in claim 25, wherein the substrate comprises metal, a plastic, wood, glass, or leather.

28. The method as claimed in claim 25, wherein the substrate is selected from the group consisting of motorbikes, bicycles, construction components, and household appliances.

29. A method of providing a catalyst to a polyurethane powder coating composition, comprising incorporating into a polyurethane powder coating composition, at least one catalyst C), of the formula $[NR^1R^2R^3R^4]^+[R^5]^-$, in which $R^1$–$R^4$ simultaneously, or independently of one another, are alkyl, aryl, aralkyl, heteroaryl or alkoxyalkyl radicals, and wherein each $R^1$–$R^4$ is aromatic, linear or branched, or unbridged or bridged with other radicals $R^1$–$R^4$, to form cyclic, bicyclic or tricyclic systems, and wherein the bridging atoms include carbon and/or heteroatoms, and wherein $R^1$–$R^4$ each independently has 1–18 carbon atoms, and wherein each radical $R^1$–$R^4$ optionally contains one or more alcohol, amino, ester, keto, thio, urethane, urea or allophanate groups, double bonds, triple bonds or halogen atoms; and $R^5$ is either OH or F, and wherein the polyurethane powder coating composition comprises:

A) at least one uretdione-containing powder coating hardener derived from one or more aliphatic, (cyclo) aliphatic, cycloaliphatic or aromatic polyisocyanates and one or more hydroxyl-containing compounds, and/or one or more monoamines, and having a melting point from 40 to 130° C., a free NCO content of less than 5% by weight, and a uretdione content of 6–18% by weight, and B) at least one hydroxyl-containing polymer having a melting point from 40 to 130° C., and an OH number between 20 and 200 mg KOH/gram, and wherein components A) and B) are present in a ratio, such that for each hydroxyl group of component B), there is from 0.3 to 1 uretdione group of component A), and the fraction of component C) is 0.001–3% by weight of the total amount of components A) and B).

30. The method as claimed in claim 29, wherein the at least one catalyst C), contains at least one member selected from the group consisting of methyltributylammonium hydroxide, methyltriethylammonium hydroxide, tetramethyl-ammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride, and benzyltrimethylammonium fluoride.

31. A method of catalyzing a curing reaction of a polyurethane powder coating composition, comprising reacting a polyurethane powder coating composition which comprises A) at least one uretdione-containing powder coating hardener derived from one or more aliphatic, (cyclo) aliphatic, cycloaliphatic or aromatic polyisocyanates and one or more hydroxyl-containing compounds, and/ or one or more monoamines, and having a melting point from 40 to 130° C., a free NCO content of less than 5% by weight, and a uretdione content of 6–18% by weight, and B) at least one hydroxyl-containing polymer having a melting point from 40 to 130° C., and an OH number between 20 and 200 mg KOH/gram, in the presence of a catalytically effective amount of at least one catalyst C), of the formula $[NR^1R^2R^3R^4]^+$ $[R^5]^-$, in which $R^1$–$R^4$ simultaneously, or independently of one another, are alkyl, aryl, aralkyl, heteroaryl or alkoxyalkyl radicals, and wherein each $R^1$–$R^4$ is aromatic, linear or branched, or unbridged or bridged with other radicals, $R^1$–$R^4$, to form cyclic, bicyclic or tricyclic systems, and wherein the bridging atoms include carbon and/or heteroatoms, and wherein $R^1$–$R^4$ each independently has 1–18 carbon atoms, and wherein each radical $R^1$–$R^4$ optionally contains one or more alcohol, amino, ester, keto, thio, urethane, urea or allophanate groups, double bonds, triple bonds or halogen atoms; and $R^5$ is either OH or F, and wherein components A) and B) are present in a ratio, such that for each hydroxyl group of component B), there is from 0.3 to 1 uretdione group of component A), and wherein the fraction of component C) is 0.001–3% by weight of the total amount of components A) and B).

32. The method as claimed in claim 31, wherein the at least one catalyst C), contains at least one member selected from the group consisting of methyltributylammonium hydroxide, methyltriethylammonium hydroxide, tetramethyl-ammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride, and benzyltrimethylammonium fluoride.

* * * * *